United States Patent
Olgaard et al.

(10) Patent No.: US 10,084,554 B2
(45) Date of Patent: Sep. 25, 2018

(54) SYSTEM AND METHOD FOR TESTING A RADIO FREQUENCY TRANSCEIVER BY CONTROLLING TEST FLOW VIA AN INDUCED INTERRUPT

(71) Applicant: LITEPOINT CORPORATION, Sunnyvale, CA (US)

(72) Inventors: Christian Volf Olgaard, Saratoga, CA (US); Ruizu Wang, San Ramon, CA (US); Guang Shi, San Jose, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 109 days.

(21) Appl. No.: 14/202,104

(22) Filed: Mar. 10, 2014

(65) Prior Publication Data

US 2015/0256274 A1    Sep. 10, 2015

(51) Int. Cl.
H04B 17/24    (2015.01)
H04B 17/00    (2015.01)

(52) U.S. Cl.
CPC ......... *H04B 17/24* (2015.01); *H04B 17/0085* (2013.01)

(58) Field of Classification Search
CPC .... H04B 17/0085; H04B 17/00; H04B 17/15; H04B 17/20; H04B 17/29; H04B 17/24
See application file for complete search history.

(56) References Cited

U.S. PATENT DOCUMENTS

| | | |
|---|---|---|
| 6,268,735 B1 | 7/2001 | Craig et al. |
| 7,167,682 B1 | 1/2007 | Madsen et al. |
| 2005/0186914 A1 | 8/2005 | Heaton et al. |
| 2008/0032753 A1* | 2/2008 | Nho ............... H04M 1/6058 455/569.1 |
| 2008/0164994 A1* | 7/2008 | Johnson ........... H01R 13/703 340/533 |
| 2008/0318629 A1* | 12/2008 | Inha ............... H04M 1/6058 455/557 |
| 2011/0103608 A1* | 5/2011 | Wu ................ H04M 1/6058 381/74 |

(Continued)

OTHER PUBLICATIONS

U.S. Appl. No. 14/147,159, "System and Method for Testing Data Packet Transceivers Having Varied Perforamcne Characteristics and Requirements Using Standard Test Equipment", filed Jan. 3, 2014; Olgaard, Christian Volf.

(Continued)

*Primary Examiner* — Dong-Chang Shiue
(74) *Attorney, Agent, or Firm* — McCracken & Gillen LLC

(57) ABSTRACT

System and method for controlling test flow of a radio frequency (RF) signal transceiver device under test (DUT) by inducing an interrupt via an internal signal interface or an external signal interface (with one example of the latter being a baseband signal interface for conveying audio signals). With exemplary embodiments, one or more DUT control signals are provided to or otherwise initiated within the DUT by inducing an interrupt, including inducement via use of the signal interface. With further exemplary embodiments, one or more test control signals are also provided to RF circuitry that responds by transmitting one or more RF receive signals for the DUT and receives from the DUT one or more RF transmit signals related to the one or more DUT control signals.

8 Claims, 4 Drawing Sheets

(56) References Cited

U.S. PATENT DOCUMENTS

| | | | |
|---|---|---|---|
| 2011/0183637 A1* | 7/2011 | Flickinger | H04B 17/0085 455/150.1 |
| 2012/0051224 A1* | 3/2012 | Olgaard | H04L 43/50 370/241 |
| 2012/0264377 A1* | 10/2012 | Seelenfreund | H04W 24/06 455/67.11 |
| 2013/0197850 A1* | 8/2013 | Yu | G01R 31/2822 702/117 |

OTHER PUBLICATIONS

International Search Report and Written Opinion relative to PCT/US2015/014632, dated Apr. 28, 2015, 12 pages.

Sep. 22, 2016—(WO) International Preliminary Report on Patentability—App PCT/US2015/014632.

* cited by examiner

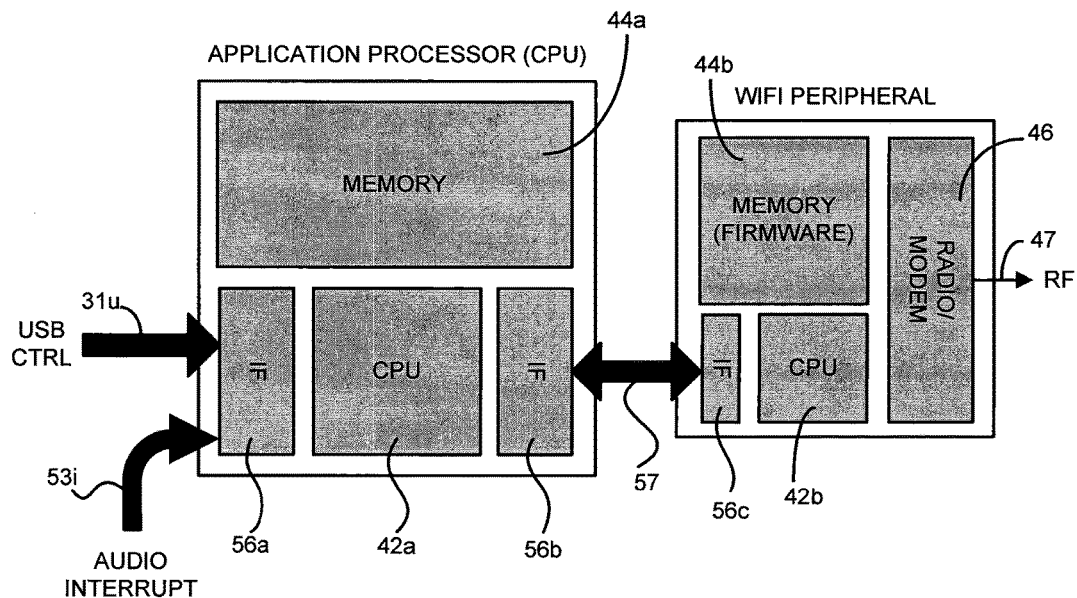
FIG. 2
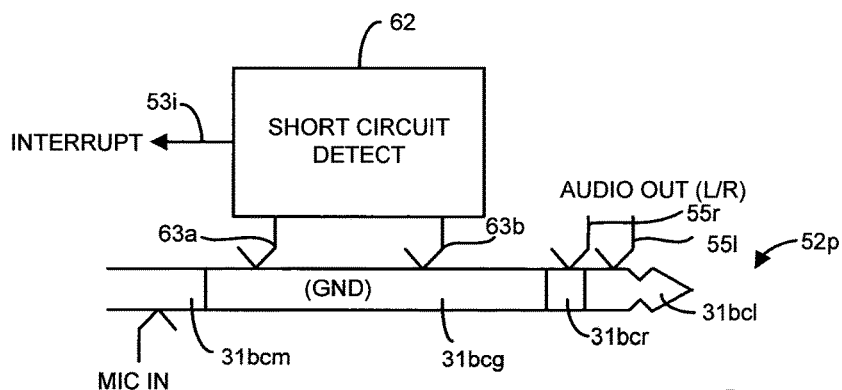
FIG. 4
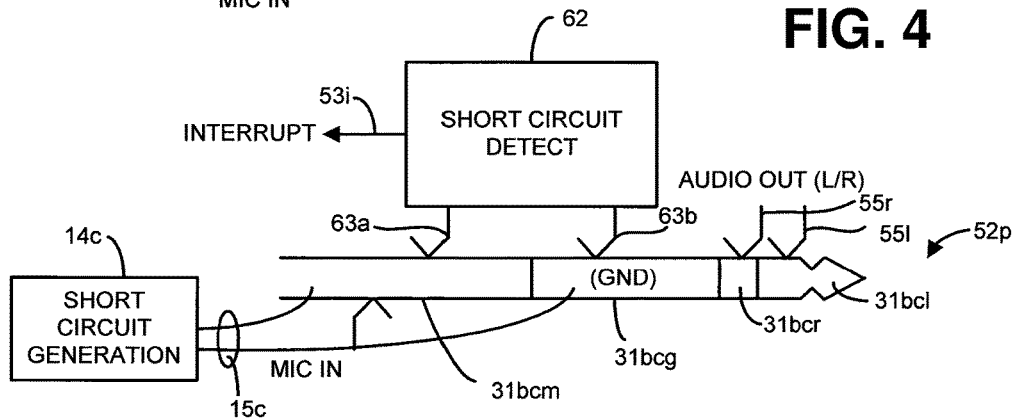

US 10,084,554 B2

SYSTEM AND METHOD FOR TESTING A RADIO FREQUENCY TRANSCEIVER BY CONTROLLING TEST FLOW VIA AN INDUCED INTERRUPT

BACKGROUND

The present invention relates to testing a packet data signal transceiver device under test (DUT), and in particular, to controlling test flow when testing such a DUT by inducing an interrupt.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal generator (VSG) for providing the source signals to be transmitted to the device under test, and a vector signal analyzer (VSA) for analyzing signals produced by the device under test. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

As is well known in the art, the time required to test a device has a linear relationship with the cost associated with conducting the test. Therefore, it is advantageous to reduce the amount of time required by a test, thereby increasing the throughput of each test system and lowering overall production costs. Several factors contribute to the total time required to test a device. These factors include the time spent handling a device, setting up the test, sending control signals from the tester to the device, capturing signals sent by the device, and analyzing those captured signals. Time spent handling and sending control signals to the device can require a proportionately large amount of the overall test time. Furthermore, these control signals are not directly involved in capturing, measuring or evaluating signals from the device. Accordingly, this is a promising area for innovation.

SUMMARY

In accordance with the presently claimed invention, a system and method are provided for testing a radio frequency (RF) signal transceiver device under test (DUT) having an external signal interface, such as a baseband signal interface for conveying audio signals. One or more DUT control signals are provided to or initiated within the DUT via use of the signal interface. One or more test control signals are also provided to RF circuitry that responds by transmitting one or more RF receive signals for the DUT and receives from the DUT one or more RF transmit signals related to the one or more DUT control signals.

In accordance with one embodiment of the presently claimed invention, a system for testing a radio frequency (RF) signal transceiver device under test (DUT) by controlling test flow via an existing external signal interface includes: one or more external signal connections for connecting to the external signal interface to convey one or more DUT control signals; control circuitry, coupled to the one or more external signal connections, to provide the one or more DUT control signals and one or more test control signals; and RF circuitry coupled to the control circuitry and responsive to the one or more test control signals by transmitting one or more RF receive signals for the DUT and receiving from the DUT one or more RF transmit signals related to the one or more DUT control signals.

In accordance with another embodiment of the presently claimed invention, a method of testing a radio frequency (RF) signal transceiver device under test (DUT) by controlling test flow via an existing external signal interface includes: connecting, via one or more external signal connections, to the external signal interface to convey one or more DUT control signals; providing the one or more DUT control signals and one or more test control signals; responding to the one or more test control signals by transmitting one or more RF receive signals for the DUT; and receiving from the DUT one or more RF transmit signals related to the one or more DUT control signals.

In accordance with another embodiment of the presently claimed invention, a method of testing a radio frequency (RF) signal transceiver device under test (DUT) by controlling test flow via an existing external signal interface includes: detecting connection of an external connector to said external signal interface; providing one or more internal DUT control signals following said detected connection of an external connector; executing one or more test commands stored within said DUT following said providing of said one or more internal DUT control signals; and communicating with an external RF signal transceiver following said executing of said one or more test commands.

BRIEF DESCRIPTION OF THE DRAWINGS

FIG. 2 depicts chip level interconnections within typical DUTs having Wi-Fi and audio signal interfaces.

FIG. 4 depicts further exemplary signal interfaces for initiating testing of a DUT in accordance with exemplary embodiments of the presently claimed invention.

DETAILED DESCRIPTION

Figure 1:
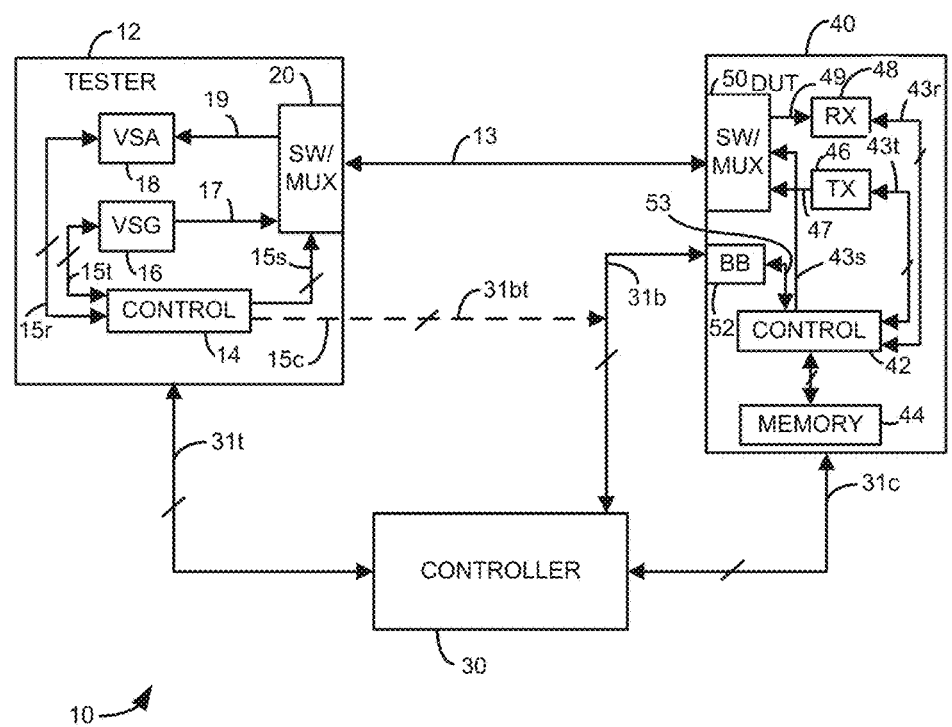
FIG. 1 depicts a testing environment for testing a DUT in accordance with exemplary embodiments of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As discussed in more detail below, testing of wireless DUTs can be more efficiently performed using predetermined program sequences that limit the number of interactions between the test equipment (also referred to herein as "tester") and DUT, due to reduced overall test time devoted to such interactions. Recent gains in testing efficiency have been achieved by implementing predetermined program sequences using code embedded within the DUT as software or firmware. (Examples of such systems and methods are disclosed in U.S. patent application Ser. No. 12/873,399, filed on Sep. 1, 2010, the contents of which are incorporated herein by reference.) Alternatively, predetermined program sequences have been used in external DUT control circuitry with the code included as software or firmware and acting as an intermediary between the tester and DUT. (Examples of such systems and methods are disclosed in U.S. patent application Ser. No. 14/147,159, filed on Jan. 3, 2014, the contents of which are incorporated herein by reference.) However, both such implementations rely on software (or firmware) techniques which can often take longer than control implemented directly via hardware. Accordingly, as discussed in more detail below, in accordance with exemplary embodiments of the presently claimed invention, test flow control can be further improved using hardware rather than software, and still further efficiency can be realized by using existing DUT signal connections (e.g., signal connections integral to the DUT in that they are part of the circuit architecture and are used during normal operations of the DUT) for conveying test control signals.

For example, in accordance with exemplary embodiments, test flow control can be applied using an external signal interface that includes an existing baseband connector. For example, popular handset devices, such as so-called smartphones, include baseband connections such as headset connectors that convey audio input signals (e.g., via a microphone) and audio output signals (e.g., left and right audio signals), plus enable plug-insertion detection (e.g., detection of a mating of the headset jack with an external headset plug by detecting a signal in the form of a non-zero DC voltage potential or a zero DC voltage potential such as a short circuit connection). In particular, such plug-insertion detection capability can be used to initiate synchronization (e.g., between the tester and DUT), initiation of a test sequence (e.g., via execution of pre-programmed test instructions stored within the DUT), while the baseband signal interface allows for conveyance of test commands to the DUT (e.g., via an audio signal, such as a frequency-shift-keyed (FSK) signal).

Referring to FIG. 1, in accordance with exemplary embodiments, a testing environment 10 includes a tester 12 for testing a DUT 40, typically under external control in the form of an external controller 30 (e.g., a personal computer). Such controller 30 communicates (e.g., commands and data) with the tester 12 via a control signal interface 31$t$. Similarly, as discussed in more detail below, the controller 30 communicates with the DUT 40 using one or more baseband signals via a control signal interface 31$b$. Alternatively, such control communications can occur between the tester 12 and the DUT 40 via another control signal interface 31$bt$. Additionally, further control communications can occur as desired between the controller 30 and DUT 40 via another control signal interface 31$c$.

The tester includes control circuitry 14, a radio frequency (RF) signal source 16 (e.g., a VSG), a RF signal receiver/analyzer 18 (e.g., a VSA), and signal routing circuitry 20 (e.g., signal switching or multiplexing circuitry). The control circuitry 14 provides control signals 15$t$ for the VSG 16, control signals 15$r$ for the VSA 18 and control signals 15$s$ for the routing circuitry 20. The control circuitry 14 can also provide baseband control signals 15$c$ for the DUT 40, as discussed above. In accordance with well-known techniques, these control signals 15$t$, 15$r$, 15$s$ ensure that the VSG 16 provides necessary RF test signals 17 for the DUT 40 (e.g., at the expected points in time in accordance with the DUT test flow), and the VSA 18 receives and/or analyzes RF test signals 19 from the DUT 40. These RF signals 17, 19 are conveyed via the signal routing circuitry 20 and a RF signal path 13, which is typically in the form of a conductive RF signal path (e.g., coaxial cable and connectors).

The DUT 40 includes control circuitry 42 (discussed in more detail below), memory circuitry 44 (e.g., for storing pre-programmed test flow commands for controlling the DUT 40 during prescribed test sequences as discussed in more detail below), RF signal transmitter circuitry 46, RF signal receiver circuitry 48, and RF signal routing circuitry 50 (e.g., such as signal switching or multiplexing circuitry). In accordance with well-known principles, the control circuitry 42 (e.g., under control of the pre-programmed test sequence commands stored within the memory 44) provides control signals 43$t$ for the transmitter circuitry 46, control signals 43$r$ for the receiver circuitry 48, and control signals 43$s$ for the routing circuitry 50 to ensure that the transmit signals 47 are conveyed to the VSA 18 (as the routed internal tester signal 19) and receive signals 49 (originating as the RF signal 17 from the VSG 16) are received by the receiver 48. Hence, it is in relation to (e.g., responsive to or in coordination with) the DUT control signals originating from the external controller 30 or tester control circuitry 14 that the DUT 40 provides control signals 43$t$ to produce one or more RF transmit signals 47 as part of the DUT test flow.

In accordance with exemplary embodiments, the control circuitry 42 receives one or more control signals 53 via baseband interface circuitry 52, which, in turn, communicates with the external controller 30 or tester control circuitry 14, as discussed above. Hence, control of the DUT 40 during testing or to initiate testing can be achieved various ways. For example, pre-programmed commands from the external controller 30 or tester control circuitry 14 (or from another source, e.g., during a prior DUT manufacturing step or process) can be stored within the memory 44 (discussed in more detail below), execution of which can then be initiated by a triggering signal or event from the baseband interface circuitry 52 (e.g., an interrupt resulting from a plug insertion), or by test initiation or control commands originating from the external controller 30 or tester control circuitry 14 and received via the baseband interface circuitry 52.

Referring to FIG. 2, in accordance with exemplary preferred embodiments, the DUT control circuitry 42 and memory 44 are divided into two processing units 42a, 42b and corresponding memory circuits 44a, 44b, respectively. One processor unit 42a and associated memory 44a form the application processor for the DUT 40, while the other processor unit 42b and associated memory 44b form part of peripheral circuitry for the RF (Wi-Fi) circuitry that also includes the RF signal transmitter 46. The application processor 42a communicates with the baseband signal interface 52 via input interface circuitry 56a, and communicates using interface signals 57 via output interface circuitry 56b with input interface circuitry 56c for the peripheral processor unit 42b. The application processor memory 44a is where pre-programmed commands for execution during DUT testing can be stored, as discussed above. As also discussed above, execution of these commands can be initiated by an interrupt 53i initiated by insertion of an audio plug 52p (discussed in more detail below), or from the external controller 30 or tester control circuitry 14.

An additional or alternative input 31u can be provided, e.g., in the form of a universal serial bust (USB) signal for providing test commands for storage within the memory 44a and/or a signal or interrupt to initiate execution of the commands.

Figure 3:
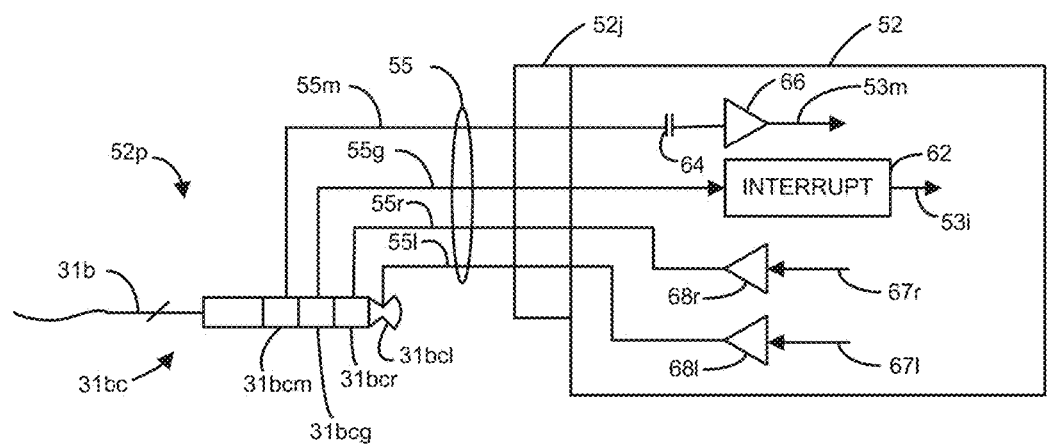
FIG. 3 depicts plug insertion detection and emulation for initiating testing of a DUT in accordance with exemplary embodiments of the presently claimed invention.

Referring to FIG. 3, the baseband signal interface 52, in accordance with exemplary embodiments, includes a multi-conductor jack 52j, interrupt circuitry 62 and buffering or amplifier circuitry 66. The jack 52j mates with an external plug 52p, and together form the physical audio signal connection commonly found on many handsets for conveying a microphone signal into the handset and stereo audio signals from the handset (typically in the form of the common 3.5 millimeter audio jack and plug connectors).

The plug 52p is a cylindrical connector 31bc having mutually electrically isolated and coaxially aligned conductors 31bcm, 31bcg, 31bcr, 31bcl for conveying an input microphone signal 55m, system ground 55g, an output right audio channel signal 55r, and an output left audio channel signal 55l.

The input microphone signal 55m generally passes through a decoupling capacitance 64 and is buffered by the amplifier circuitry 66 to provide an audio input signal 53m. Upon insertion of the plug 52p into the jack 52j, connection of the ground ring 31bcg is detected by the interrupt circuitry 62, which generates a corresponding interrupt signal 53i. As discussed above, this interrupt signal 53i can be used to initiate execution of test flow commands stored within the memory 44 (FIG. 1) to control the test sequence operations performed by the DUT 40. Alternatively, as discussed above, control information (e.g., commands and data) can be provided in the form of the baseband audio signal 55m (e.g., encoded as a FSK signal), which is decoupled 64 and buffered 66 to be provided as a control signal 53m for the control circuitry 42 (FIG. 1), which will decode (e.g., from the FSK signal) and use this control information for providing the appropriate control signals 43t, 43r, 43s for execution of the desired DUT test operations.

Additionally, the baseband interface circuitry 52 can include output amplifiers 68r, 68l for providing buffered or amplified versions 55r, 55l of outgoing right 67r and left 67l audio channel signals.

Referring to FIG. 4, in accordance with exemplary embodiments, an interrupt signal 53i can be initiated in response to insertion of the audio plug 52p by detecting a resulting short circuit between two terminals 63a, 63b of a short circuit detection circuit 62. In accordance with well-known techniques, upon insertion of the plug 52p, the ground ring 31bcg becomes aligned and in contact with the terminals 63a, 63b of the short circuit detector 62, which produces the interrupt signal 53i indicative of such short circuit. Alternatively, the terminals 63a, 63b of the short circuit detection circuit 62 can be aligned for contact with the ground ring 31bcg and microphone input ring 31bcm. In this case, insertion of the plug 52p does not immediately produce a short circuit between the short circuit detector terminals 63a, 63b. However, short circuit generation circuitry 14c within the tester 12 (FIG. 1) can provide a short circuit 15c between the ground ring 31bcg and microphone input ring 31bcm, independent of audio plug 52p insertion. Alternatively, the short circuit signal 15c can also be provided by the external controller 30, e.g., by providing a very low impedance electrical path between the two terminals 63a, 63b of the short circuit detection circuit 62, and thereby simulating insertion or placement of the ground ring 31bcg.

As a further alternative, the interrupt signal 53i can be initiated in response to another form of baseband signal in the form of a short circuit provided between the two terminals 63a, 63b of the short circuit detection circuit 62, such as by insertion of a "dummy" audio plug 52p, e.g., an audio plug 52p having no electrical connection to other circuitry (nor any physical connection necessarily either). Insertion of such a plug 52p having the ground ring 31bcg would provide the short circuit needed between the two terminals 63a, 63b of the short circuit detection circuit 62 to initiate generation of the interrupt 53i, which, in turn, is used to initiate the test sequence operations, as discussed above.

Figure 5:
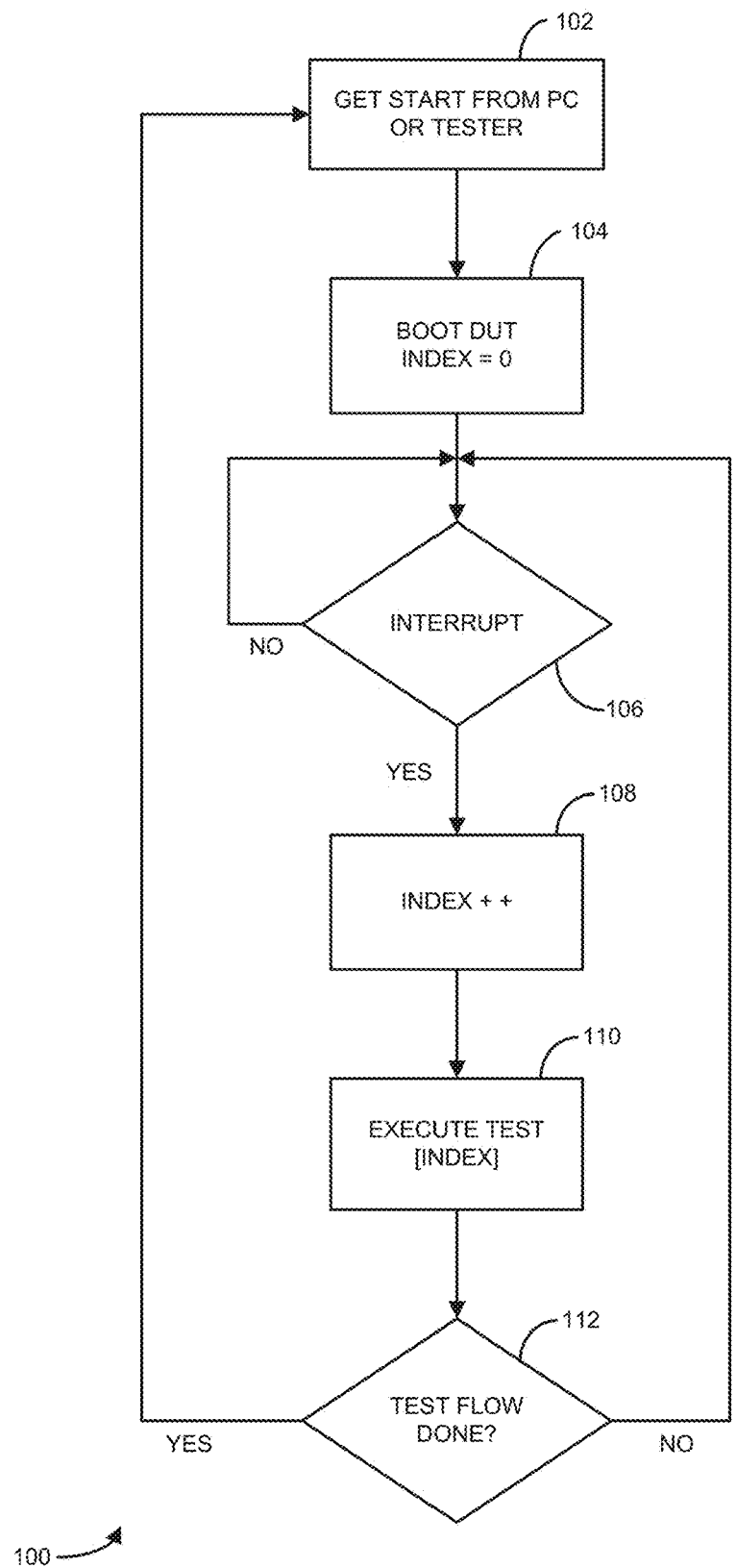
FIG. 5 depicts a flowchart representing a test flow in accordance with exemplary embodiments of the presently claimed invention.

Referring to FIG. 5, in accordance with exemplary embodiments, controlling test flow in accordance with an interrupt signal 53i received via the interface circuitry 52, using pre-programmed control information stored within the memory 44 or control information received in a real time signal 53m via the interface circuitry 52, can be achieved as shown. Test initiation 102 begins with an initiating command or signal (e.g., from an external controller 30 or tester control circuitry 14), following which the DUT 40 is initialized or "booted" 104, with an initial testing index (e.g., zero). Following this, it is determined whether an interrupt has occurred 106. Following detection of an interrupt, as discussed above, the test sequence index is incremented 108 (e.g., from an initial index indicative of DUT boot to the first index indicative of test initiation) and the DUT test sequence begins, with execution of the test sequence step 110 corresponding to the then current index value. (Alternatively, testing can be initiated immediately following booting of the DUT 40.) Next, it is determined whether the test flow has been completed 112. If not, testing resumes by determining whether an interrupt has occurred 106, and if so incrementing of the index 108, followed by execution of the next test step 110, and so on, until test completion. If the test sequence has been completed, testing is terminated until the current or replacement DUT has been initialized 102 or booted.

While the discussion above has been in the context of using an existing external signal interface, such as an audio signal connector and its associated interface circuitry, it will be readily appreciated and understood that other external signal interfaces can be used as well. The characteristics of the signal(s) normally conveyed (e.g., frequency, magnitude, etc.) via the external signal interface used are not critical when, as discussed above, commands and data needed for DUT testing are already stored within the DUT. A simple baseband signal or DC voltage potential, or an event such as detection of a physical connection between an external connector and the existing external interface connector of the DUT, can be sufficient to initiate testing of the DUT.

Figure 6:
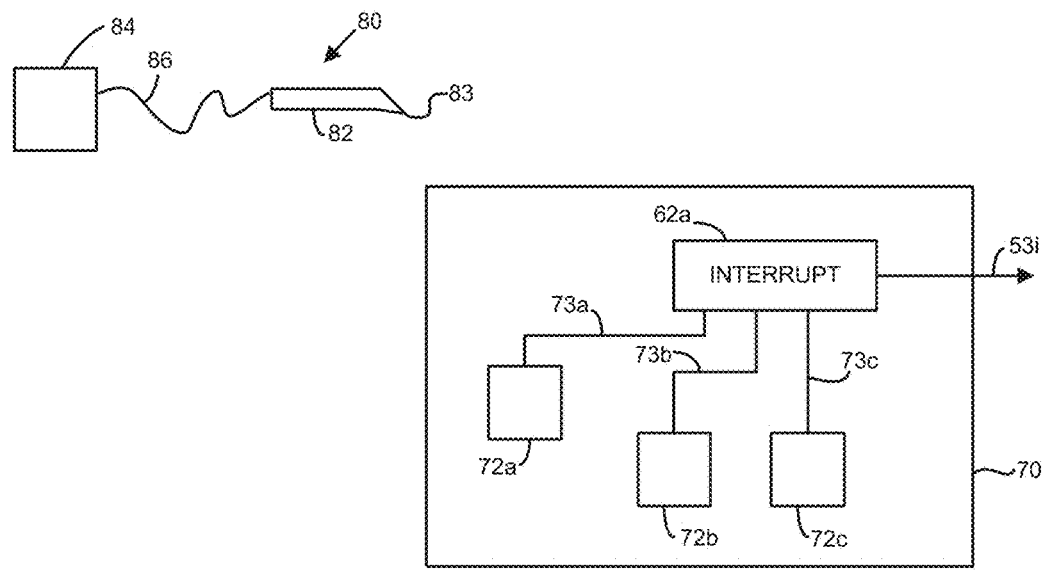
FIG. 6 depicts further exemplary signal interfaces for initiating testing of a DUT in accordance with exemplary embodiments of the presently claimed invention.

Referring to FIG. 6, in accordance with further exemplary embodiments, inducement of an interrupt signal to initiate testing of the DUT can be accomplished through the use of an internal electrode, contact or connection 73 located internal to the DUT, such as on the surface of a circuit board assembly 70. For example, interrupt circuitry 62a typically resides on an internal circuit board assembly 70, along with additional or circuit elements 72a, 72b, 72c, the operations of which will produce signals via internal circuit connections 73a, 73b, 73c, to which the interrupt circuitry 62a responds by generating one or more interrupt signals 53i for various purposes. As discussed above, this interrupt signal 53i can be used to initiate testing of the DUT.

Inducement of such an interrupt signal 53i can be accomplished by using an external conductor, such as a probe assembly 80, to contact one of the internal signal interfaces 73a, 73b, 73c. For example, the probe assembly 80 includes an electronic test probe 82 having a contact point 83 and is connected to test circuitry 84 via one or more test signal connections 86. By bringing the probe contact point 83 in electrical contact with one of the internal signal interfaces 73a, 73b, 73c, and applying a signal, e.g., a baseband signal such as a DC voltage potential or short circuit to signal ground potential, an electrical stimulus needed to cause the interrupt circuitry 62a to generate an appropriate interrupt signal 53i can be provided.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing a radio frequency (RF) signal transceiver device under test (DUT) by initiating test flow within said DUT with an external interrupt signal, comprising:

receiving, via at least one external baseband signal interface of said DUT, at least first and second interrupt signals;
    operating an application processor within said DUT to
        detect said first interrupt signal;
        provide, following said detection of said first interrupt signal, a first one or more DUT control signals;
        detect said second interrupt signal;
        provide, following said detection of said second interrupt signal, a second one or more DUT control signals;
    operating a peripheral processor within said DUT to
        execute, in response to said first one or more DUT control signals, a first one or more test commands previously stored within said DUT;
        transmit and receive, via a common bi-directional conductive RF signal path separate from said at least one external baseband signal interface, first outgoing and incoming RF signals to and from said tester, respectively, in response to said execution of said first one or more test commands;
        execute, in response to said second one or more DUT control signals, a second one or more test commands previously stored within said DUT; and
        transmit and receive, via said common bi-directional conductive RF signal path, second outgoing and incoming RF signals to and from said tester, respectively, in response to said execution of said second one or more test commands.

2. The method of claim 1, wherein said first and second one or more test commands previously were stored within said peripheral processor.

3. The method of claim 1, wherein at least one of said second one or more test commands is different from at least one of said first one or more test commands.

4. The method of claim 1, wherein at least one of said second one or more DUT control signals is different from at least one of said first one or more internal DUT control signals.

5. The method of claim 1, wherein:
    at least one of said second one or more test commands is different from at least one of said first one or more test commands; and
    at least one of said second one or more internal DUT control signals is different from at least one of said first one or more internal DUT control signals.

6. The method of claim 1, wherein said detection of said interrupt signal comprises detection of a voltage potential between first and second electrical connections within said application processor.

7. The method of claim 1, wherein said detection of said interrupt signal comprises detection of a short circuit between first and second electrical connections within said application processor.

8. The method of claim 1, wherein said operating an application processor comprises operating an application processor within said DUT.

\* \* \* \* \*